No. 843,932. PATENTED FEB. 12, 1907.
B. F. A. COURTINE.
MACHINE FOR MANUFACTURING AND BUNDLING VERMICELLI AND THE LIKE.
APPLICATION FILED MAY 13, 1905.
4 SHEETS—SHEET 1.
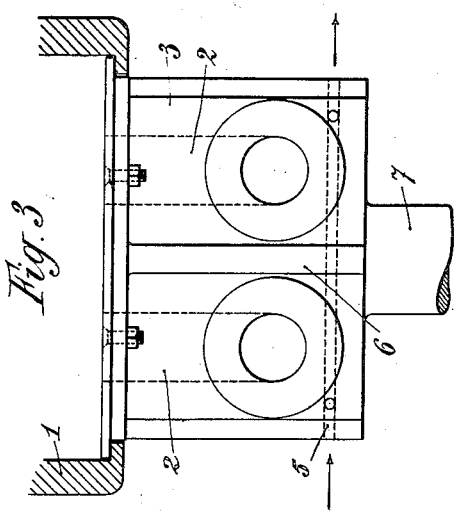
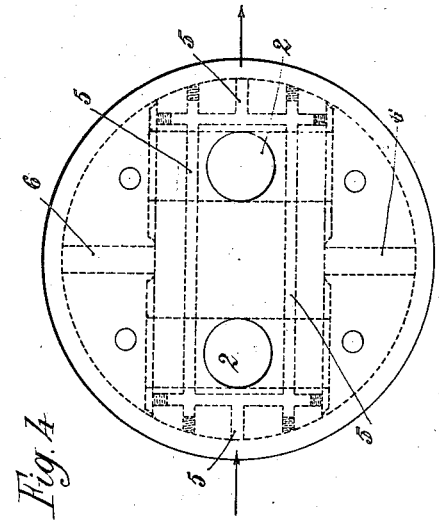
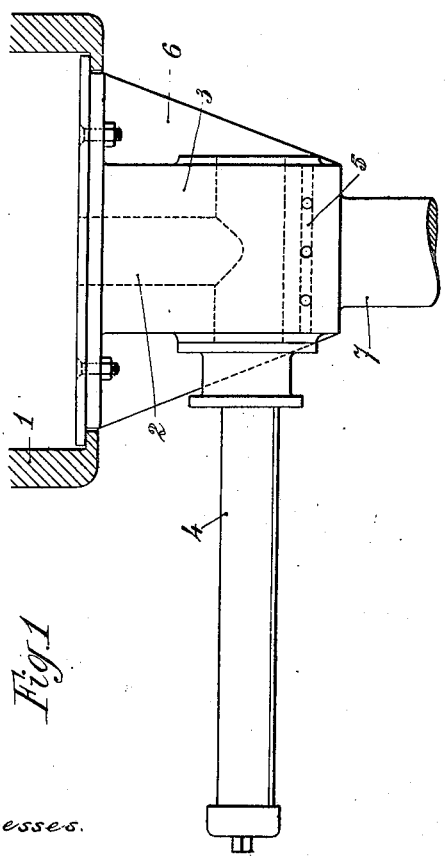
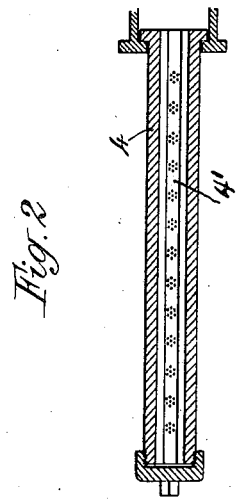

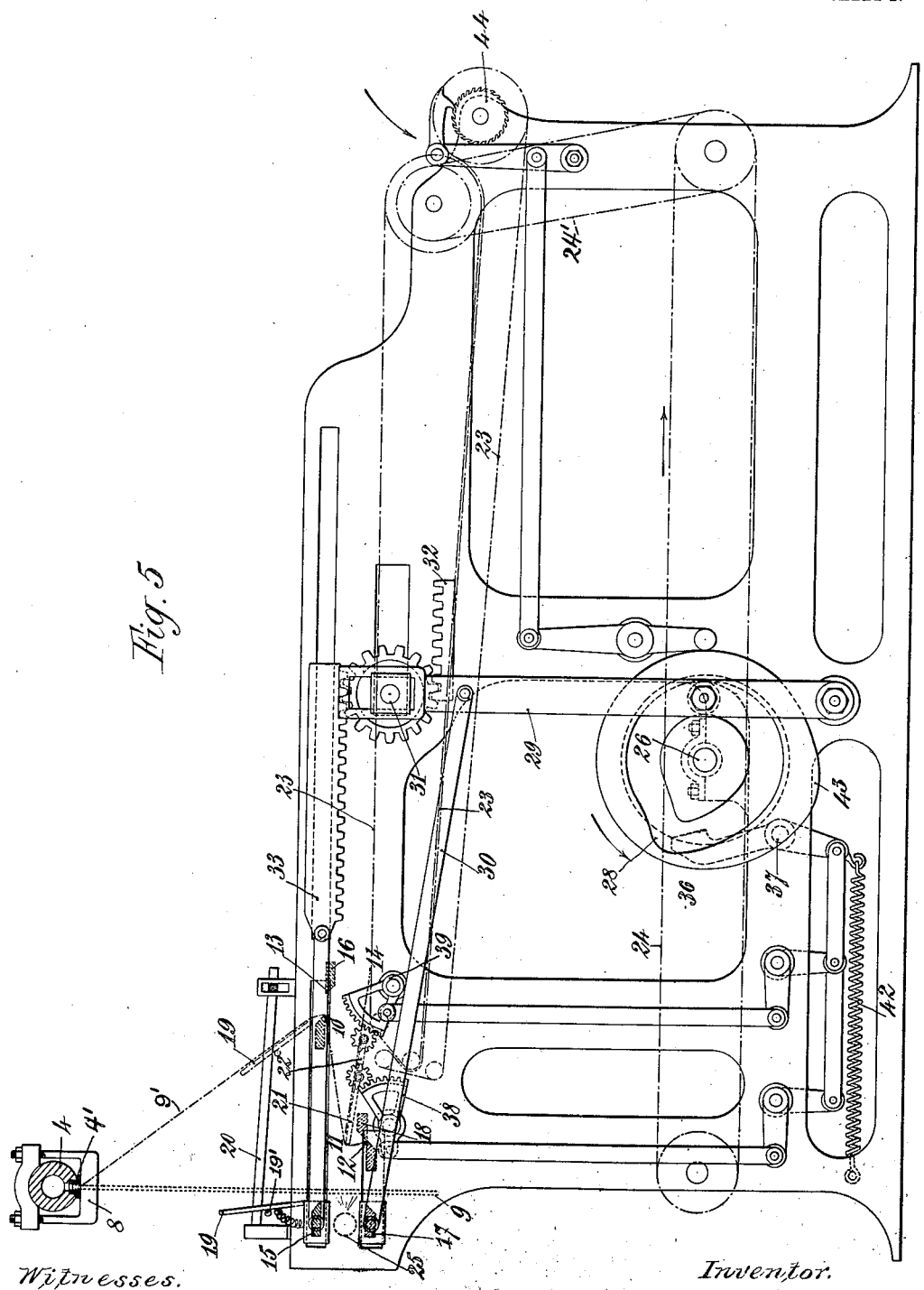

No. 843,932.  
B. F. A. COURTINE.  
MACHINE FOR MANUFACTURING AND BUNDLING VERMICELLI AND THE LIKE.  
APPLICATION FILED MAY 13, 1905.  
PATENTED FEB. 12, 1907.
4 SHEETS—SHEET 3.
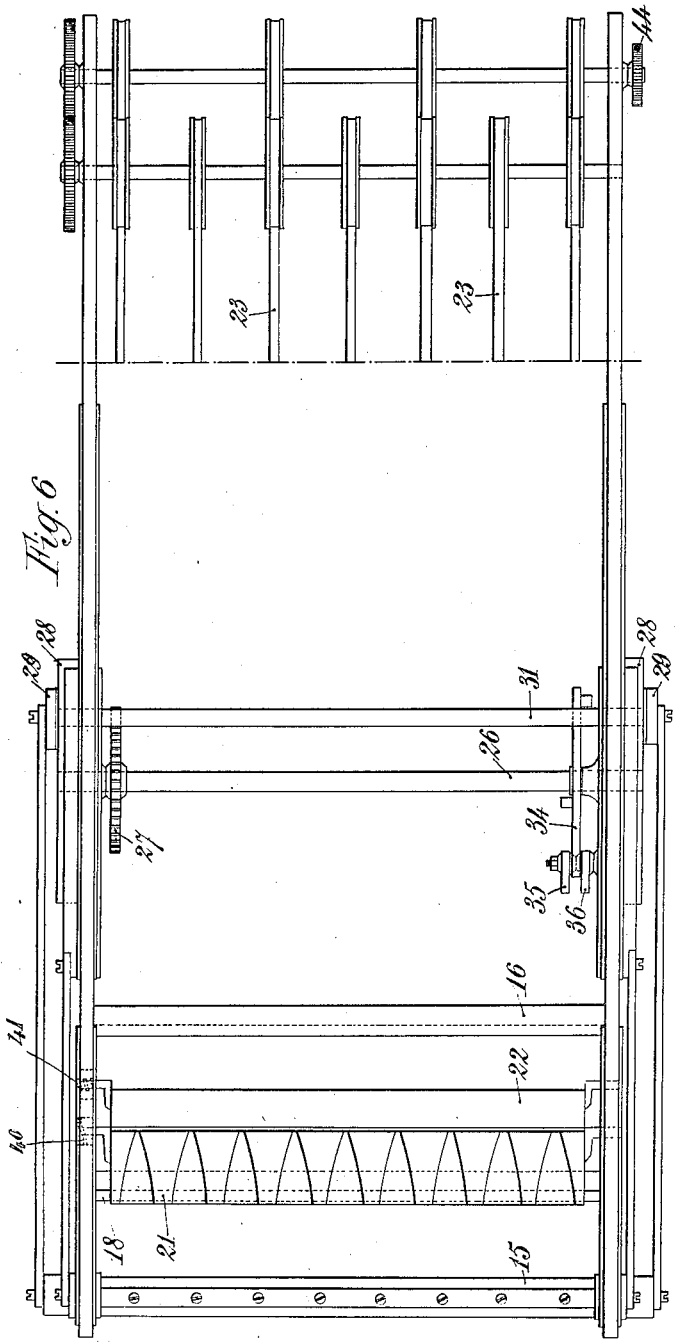

No. 843,932. PATENTED FEB. 12, 1907.
B. F. A. COURTINE.
MACHINE FOR MANUFACTURING AND BUNDLING VERMICELLI AND THE LIKE.
APPLICATION FILED MAY 13, 1905.

4 SHEETS—SHEET 4.

Witnesses.
H. L. Ames
B. Dommers

Inventor.
Benjamin F. A. Courtine
by Henry Ort
atty.

ID

UNITED STATES PATENT OFFICE.

BENJAMIN FERDINAND AUGUSTE COURTINE, OF MAISONS-ALFORT, FRANCE.

MACHINE FOR MANUFACTURING AND BUNDLING VERMICELLI AND THE LIKE.

No. 843,932.  Specification of Letters Patent.  Patented Feb. 12, 1907.

Application filed May 13, 1905. Serial No. 260,356.

*To all whom it may concern:*

Be it known that I, BENJAMIN FERDINAND AUGUSTE COURTINE, citizen of the Republic of France, and resident of Maisons-Alfort, in the said Republic, manufacturer, have invented certain new and useful Improvements in Machines for Manufacturing and Bundling Vermicelli and the Like; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to improvements in machines for manufacturing and bundling vermicelli and the like.

The invention has for its objects, first, to so construct the hydraulic press containing the dough that it may deliver the dough in the form of groups of yarns, which groups are arranged in one horizontal straight line (or several straight lines in case several bundling-machines coöperate with one and the same press) and are each composed of the proper number of yarns to make up one bundle and that the dough may be heated in the vicinity of the delivery-apertures; second, to cut or sever both ends of the yarns of dough in a proper way to secure a uniform length of the latter; third, to fold the latter by means of pivoting and cross-moving pallets, so as to make bundles very similar to hand-made bundles; fourth, to automatically feed sheets of paper on which the bundles are laid as they are made; fifth, to carry the waste away; sixth, to partially dry the product during the bundling process.

Figure 7:
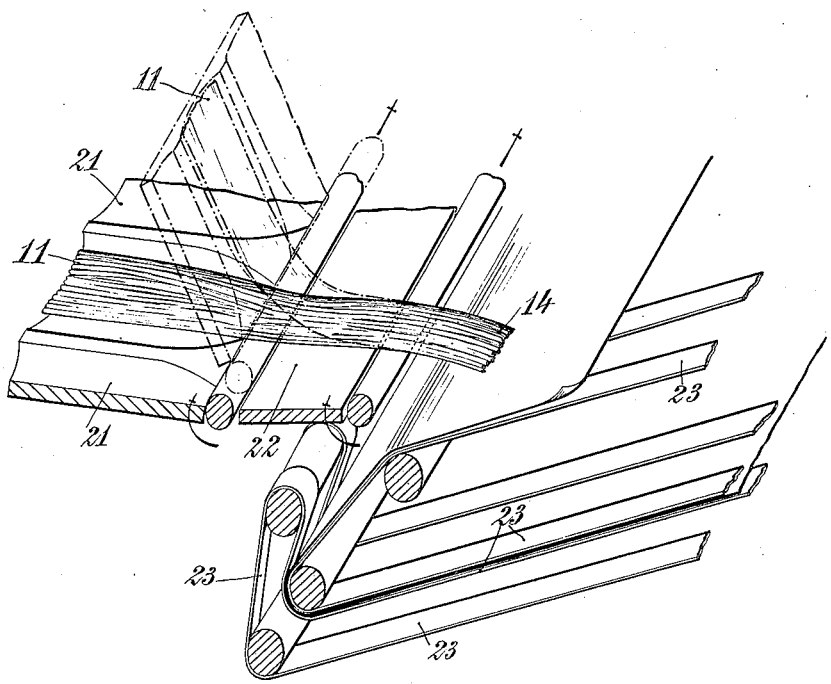
Figure 8:
Figure 10:
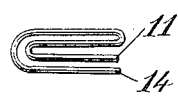
Figure 9:
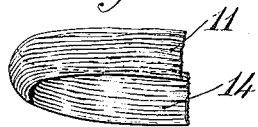
Figure 11:
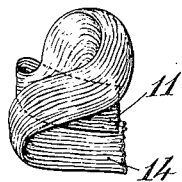

In the drawings, Figure 1 is a side elevation, partly in section, showing the arrangement of the lower part of the hydraulic press for the dough with one delivery-pipe in position, which latter is provided with the die, through the apertures of which groups of yarns are delivered, as aforesaid. Fig. 2 is a horizontal section of said delivery-pipe and die. Fig. 3 is a front view of the block attached to the bottom of the press, the delivery-pipe shown, Fig. 1, being removed. Fig. 4 is a top view of same block. Fig. 5 is a side elevation, partly in section, of the bundling-machine proper and the delivery-pipe and die feeding the dough-yarns. Fig. 6 is a top view of said machine. Fig. 7 is a perspective view, at a larger scale, of part of the two folding or bundling pallets and the appliance for feeding the paper sheets on which the bundles are laid. Figs. 8 and 9 are respectively the side and top views of a group of dough-yarns folded only once. Figs. 10 and 11 are similar views of a group of yarns folded twice—*i. e.*, a bundle completed.

The dough contained in the press 1, Figs. 1, 2, 3 and 4, passes through channels 2 2 in the block 3, each of which branches into two passages and thence into delivery-pipes 4. (Only one of the latter is shown.) Each of the pipes 4 is provided with a longitudinal slot in which a die 4' is arranged, as shown at Figs. 2 and 5, the latter being held in position by metal saddles 8.

The dough instead of being heated in the press 1, as usual, by means of a steam-jacket is heated in the block 3 by means of steam circulating in passages 5.

The block 3 is carried by a pillar 7 and is provided with ribs 6, which support the bottom plate of the press.

On issuing from the die 4' the groups of dough-yarns flow in the form of a vertical sheet 9, Fig. 5, between the movable knives 15 and 17 and the stationary counter-blades 16 and 18. When the yarns are long enough, the knives 15 and 17 advance at a different speed to the points 10 and 12, respectively, the groups of yarns following being driven along by a board 19, yieldingly connected to the upper knife 15, which board is provided with a pin 19', which slides along a guide-rod 20, so that it becomes more and more inclined, so as to always slant toward the die 4'. Thus the yarns come to the position 9' 10 11 12, Fig. 5.

The object of the knives 17 and stationary blades 18 is to cut off the lower ends of the yarns, which latter do not flow at exactly the same speed so as to equalize the lengths thereof. As will be readily understood, the upper knife 15 must sever the yarns practically at the same time as the lower one acts. In fact, when the lower ends of the yarns are cut off the upper knife has still to advance the small distance 10 13. During this motion the lower ends of the yarns reach the point 11 at the edge of the first folding-pallet. Therefore when the upper knife performs its duty the yarns fall down in the position 11 14, Figs. 5 and 7, they lying partly on the pallets 21 and 22 and partly on a sheet of paper fed by ribbons 23. The knives 15 and 17 return then to their original positions, allowing the dough-yarns to flow in front of them in view of the next stroke. Meantime, by means of a mechanism which will be hereinafter described the pallet 21, which is provided with a groove for each group of yarns, rotates from left to right or in an upward direction and simultaneously moves across the machine. This cross motion ceases when the pallet has rotated about one-sixth of a revolution and is in the position shown in dotted lines on Fig. 7. At that moment the position of the end 14 of the group of yarns has not changed, while its end 11 has moved crosswise together with the pallet 21 and its spindle. Consequently the further two-sixths of a revolution made afterward by said pallet will bring down the end 11 at a point which will not be directly over 14, but at a distance from it on the side, thus forming in the group of yarns a sort of loop or curled portion the same as in hand labor. (See Fig. 9.) The first pallet 21 then comes back to its original position, (shown in full lines at Fig. 7,) while the second pallet 22 rotates from left to right in its turn, simultaneously moving crosswise together with its spindle. Said spindle being located in the middle of the length of the group of yarns already folded once, (see Figs. 8 and 9,) said group becomes folded once more when pallet 22 has turned half a revolution, and, moreover, one of its ends is displaced with regard to the other, a second rounded portion being formed. The bundle when completed is therefore of the shape shown in Figs. 10 and 11, a shape very similar to that of the hand-folded bundles of vermicelli, while more uniform.

As will be easily understood from the above description, the row of finished bundles lies on the sheet of paper close to the second pallet. It is advanced by the paper, which moves the proper distance after the folding is completed.

The ends cut off from the threads by the lower knife 17 and its counter-blade 18 drop onto an endless apron 24, which carries them to the end of the machine, where they are collected.

It is sometimes desirable to gently dry the dough-yarns while they are flowing down in order to avoid their sticking to the bundling-pallets. This result may be attained, for instance, by providing a perforated tube 25 in connection with a compressed-air tank. (Not shown.) A blast of air is also advantageously sent on the completed bundles while being advanced on the paper to enable them to keep their shape better during the handling of the sheets of paper on which they rest. This air-blast may also be connected with the same compressed-air tank that supplies the tube 25.

The mechanical contrivances used to impart the necessary movements to the parts of the machine in view of enabling them to perform the above-explained functions are as follows: Supposing six rows of bundles can be made per minute, (this agrees with the average speed with which the dough passes through the die,) than a shaft 26 is driven at the speed of six revolutions per minute, for instance, through a cogged wheel 27 secured to it and an endless chain. The shaft 26 carries at each end a grooved cam 28, revolving in the direction shown by the arrow at Fig. 5, and in the groove of each cam 28 is located a roller mounted on a lever 29. When the projection on the cam-surface engages such roller, lever 29 is pushed to the right, moving the lower knife 17 in this direction and against the counter-blade 18 through a connecting-rod 30, so the knife cuts the lower ends of the threads at 12. To the upper end of each lever 29 is screwed a frame along which a bush can slide which carries a shaft 31. To the latter a pinion is secured which engages both a stationary rack 32 and a movable rack 33, which latter is connected with knife 15. Owing to this arrangement rack 33 moves double the distance the shaft 31 moves, so that a comparatively small displacement of the lever 29 is sufficient to secure the full stroke of the upper knife 15. After the latter has reached the counter-blade 16 and severed the yarns of dough cams 28 bring it again to its original position at the left of Fig. 5. A disk 34 is secured to shaft 26 inside the frame of the machine and is provided with a roller on each face. These rollers, arranged about ninety degrees apart in succession, engage levers 35 36, having their fulcrum at 37, which through crank-levers and rods, respectively, actuate quadrants 38 39, engaging pinions secured to the spindles of the pallets 21 22 in view of imparting to the latter a rotary motion in one direction. The rotary motion in the reverse direction is imparted to them, respectively, by coil-springs 42, connected to the levers 35 36. As to the cross motion of the pallets 21 22, it is imparted to them by means of stationary screw-nuts 40 41, through which a threaded portion of their studs pass. During that motion the teeth of the pinions on said studs remain in engagement with the teeth of the quadrants 38 39, the pinions being made thick enough for the purpose.

There are an upper and a lower series of endless ribbons 23 23, carried at one end by rolls located under the pallets 21 22 and at the other end by rolls situated at the front end of the machine, (on the right of Fig. 5.) Sheets of paper are passed by hand or otherwise between the two series at the latter point, as shown by the arrow at Fig. 5, and said sheets, which are close to each other, advance step by step, as will be hereinafter explained, so as to come finally at the top in rear of the pallet 22 to receive the bundles on them. As the machine has produced arrow of bundles the endless ribbons 23, carrying the sheet of paper on which the latter are laid, advances one step by reason of a projection 43 on the above-mentioned cam 28, actuating through a series of levers, as shown, a pawl which engages a ratchet-wheel 44, secured to the shaft of one of the rolls carrying the ribbons.

Near the lower part of the machine an endless apron 24, carried by a pair of rolls, is arranged, as shown at Fig. 5, in order to receive on it the waste—that is to say, the lower ends of the threads of dough cut off by the lower knife 17—and convey the same to the front end of the machine, where they are collected. Such endless apron is driven step by step by one of the rolls carrying the ribbons 23 by means of an endless chain 24', as shown at Fig. 5.

I claim—

1. In a machine of the character described, the combination of a dough-feeding device, means for cutting the dough into uniform lengths, means for folding said cut dough, means for again folding said folded dough, and means for feeding sheets of paper to the folded dough.

2. In a machine of the character described, the combination of movable knives, means to deliver yarns of dough in front of said knives, a counter-blade for each knife, means to advance the yarns and means to advance the knives to said counter-blades.

3. In a machine of the character described the combination of a pair of movable knives, means to deliver yarns of dough in front of said knives, counter-blades mounted in front of the knives, at different distances, therefrom, means to advance the dough to the counter-blades, and means to advance the knives at different speed to the latter.

4. In a machine of the character described, the combination of a pair of movable knives, means to deliver yarns of dough in front of said knives, counter-blades mounted in front of the knives at different distances therefrom, means to advance the dough to the counter-blades, means to advance the knives at different speed to the latter, pallets to receive the cut dough, and means to rotate the pallets.

5. In a machine of the character described, the combination of a pair of horizontally-movable knives mounted in different planes, a counter-blade mounted in front of each knife, means to deliver yarns of dough between the knives and counter-blades, means to advance the dough to the latter, means to advance the knives to said blades, two pallets to receive the cut dough, means to rotate the pallets at different periods, and means to move said pallets laterally.

6. In a machine of the character described, the combination of a die having holes arranged in groups, means for heating dough before passing through the die, a pair of knives movable in different planes, counter-blades mounted at different distances from the knives, means for advancing the knives at different speeds, a pivoted member connected with one of the knives for advancing the dough to the counter-blades, means for rotating said pivoted member toward the die, pivotally-mounted pallets, means to rotate, and means to simultaneously move the pallets laterally.

7. In a machine of the character described, the combination of a pair of horizontally-movable knives mounted in different planes, a counter-blade mounted in front of each knife, means to deliver yarns of dough between the knives and counter-blades, means to advance the dough to the latter, means to advance the knives to said blades, two pallets to receive the cut dough, means to rotate the pallets at different periods, and means to independently rotate and simultaneously move the pallets laterally.

8. In a machine of the character described, the combination of a pair of horizontally-movable knives mounted in different planes, a counter-blade mounted in front of each knife, means to deliver yarns of dough between the knives and counter-blades, means to advance the dough to the latter, means to advance the knives to said blades, two pallets to receive the cut dough, means to rotate the pallets at different periods, means to independently rotate and simultaneously move the pallets laterally, and means to feed wrappers to one of the pallets.

9. In a machine of the character described, the combination of a pair of horizontally-movable knives mounted in different planes, a counter-blade mounted in front of each knife, means to deliver yarns of dough between the knives and counter-blades, means to advance the dough to the latter, means to advance the knives to said blades, two pallets to receive the cut dough, means to rotate the pallets at different periods, means to independently rotate and simultaneously move the pallets laterally, and endless bands adapted to feed wrappers to one of the pallets.

10. In a machine of the character described, the combination of a pair of horizontally-movable knives mounted in different planes, a counter-blade mounted in front of each knife, means to deliver yarns of dough between the knives and counter-blades, means to advance the dough to the latter, means to advance the knives to said blades, two pallets to receive the cut dough, means to rotate the pallets at different periods, means to independently rotate and simultaneously move the pallets laterally, means to feed wrappers to one of the pallets, endless bands adapted to feed wrapper to one of the pallets, and means for partly drying the yarns of dough before bundling them.

11. In a machine of the character described, the combination of a press for the dough a die fed by the press having groups of holes arranged in line, means for heating the dough before it passes through the die, an upper and lower horizontally-movable knife, stationary counter-blades mounted opposite the knives at different distances therefrom, means for imparting a greater speed to the upper knife than the lower one, to cause the latter to cut in advance of the former, a pivoted board moving with the upper knife supporting the yarns of dough, a guide adapted to rotate the board in the direction of the die, pivotally-mounted pallets, means to simultaneously rotate and laterally shift the pallets.

12. In a machine of the character described, the combination of a press for the dough, a pipe communicating therewith, a die in said pipe having groups of holes arranged in line, means for heating the dough before it passes through the die, an upper and lower knife, a stationary counter-blade opposite each knife, a lever, a cam to actuate the latter, means connecting the lever and knives, adapted to advance the lower knife, to a counter-blade in advance of the upper knife, a board moving with the upper knife supporting the yarns, a guide adapted to slant the board toward the die, two pivoted pallets, and means to simultaneously rotate and laterally shift the pallets.

13. In a machine for manufacturing and bundling vermicelli and the like, the combination of a press for the dough, a pipe connected therewith, a die in said pipe having groups of holes arranged in line, a group for each bundle; means for heating the dough before it passes through said die; an upper and a lower knife, stationary counter-blades, opposite the knives to cut both ends of the yarns of dough of which the bundles are to be made, a cam, a slotted lever actuated by said cam, a rod connecting the lever and lower knife, a stationary rack, a movable rack connected to said upper knife, a pinion movable mounted in said slot engaging the stationary and movable racks, a board moving with the upper knife and supporting the yarns, a guide keeping such board slanting toward the die, and two pallets arranged side by side capable of moving around an axis and simultaneously moving transversely to the machine.

14. In a machine for manufacturing and bundling vermicelli and the like, the combination of a press for the dough, a pipe connected to said press, a die in said pipe having groups of holes arranged in line, a group for each bundle, means for heating the dough before it passes through said die, two knives, stationary counter-blades, arranged opposite said knives to cut both ends of the yarns of dough of which the bundles are to be made, a cam, a slotted lever actuated thereby, a rod connecting the lower knife and lever, a stationary rack, a movable rack connected to said upper knife, a pinion movably mounted in said slot engaging said stationary and movable racks, a board moving with the upper knife and supporting the yarns, a guide keeping such board slanting toward the die, two pallets arranged side by side, and spindles for said pallets, capable of rotating in both directions, screw-threaded portions on said spindles and stationary nuts adapted to receive the threaded portions.

In testimony that I claim the foregoing as my invention I have signed my name in presence of two subscribing witnesses.

BENJAMIN FERDINAND AUGUSTE COURTINE.

Witnesses:
   H. C. COXE,
   ALCIDE FABE.